United States Patent
Breitbach

(10) Patent No.: US 10,028,639 B1
(45) Date of Patent: Jul. 24, 2018

(54) APPARATUS AND METHOD FOR CLEANING AND MAINTAINING DEEP FAT FRYERS AND SIMILAR DEVICES

(71) Applicant: B.O.B. Enterprises of Waterloo, Inc., Waverly, IA (US)

(72) Inventor: Joe Breitbach, Waverly, IA (US)

(73) Assignee: B.O.B. Enterprises of Waterloo, Inc., Waverly, IA (US)

( * ) Notice: Subject to any disclaimer, the term of this patent is extended or adjusted under 35 U.S.C. 154(b) by 603 days.

(21) Appl. No.: 14/616,092

(22) Filed: Feb. 6, 2015

Related U.S. Application Data

(60) Provisional application No. 61/937,096, filed on Feb. 7, 2014.

(51) Int. Cl.
| | |
|---|---|
| A47L 17/06 | (2006.01) |
| A47J 37/12 | (2006.01) |
| B08B 9/00 | (2006.01) |
| B08B 9/04 | (2006.01) |
| B08B 7/00 | (2006.01) |
| B08B 9/08 | (2006.01) |
| B08B 1/00 | (2006.01) |

(52) U.S. Cl.
CPC ........... *A47L 17/06* (2013.01); *A47J 37/1271* (2013.01); *B08B 1/005* (2013.01); *B08B 9/0808* (2013.01)

(58) Field of Classification Search
None
See application file for complete search history.

(56) References Cited

U.S. PATENT DOCUMENTS

| | | | | | |
|---|---|---|---|---|---|
| 2,264,374 | A | * | 12/1941 | Henschell | A47L 13/08 15/236.07 |
| 2,521,018 | A | * | 9/1950 | Moore | A47J 37/1271 15/236.01 |
| 4,355,432 | A | * | 10/1982 | Storm, Jr. | A47G 21/04 15/236.07 |

(Continued)

OTHER PUBLICATIONS

Deep Fryer, Wikipedia, http://en.wikipedia.org/wiki/Deep_fat_frier, 4 pages, [retrieved from the Internet on Nov. 22, 2013].

(Continued)

*Primary Examiner* — Eric W Golightly
*Assistant Examiner* — Arlyn I Rivera-Cordero
(74) *Attorney, Agent, or Firm* — McKee, Voorhees & Sease, PLC

(57) ABSTRACT

A method and tool(s) for maintaining a liquid fryer or broaster having a frypot for holding frying liquid including a V-shaped or conical bottom. The method can include: Providing a tool having a generally normally flat blade extending longitudinally from a handle end to a distal end, the blade comprising a material having sufficient stiffness to impart scraping force to the distal end over a range of temperatures including 150° F., but sufficient flexibility to slide past steps and angles, including acute angles, while scraping the frypot. Scraping an internal wall of the frypot, beginning above and then down to and past the V-shaped or conical bottom. Draining the remaining frying liquid. Cleaning the interior of the frypot/vat. Refilling the frying liquid. The tool(s) can be elongated with different widths and leading edges and have characteristics like above.

3 Claims, 20 Drawing Sheets

(56) References Cited

U.S. PATENT DOCUMENTS 5,629,039 A * 5/1997 Brintle ............... A47J 37/1223
210/DIG. 8

OTHER PUBLICATIONS

Filter System Replacement Parts, 4 pages, printed on or about Feb. 7, 2014.
IF-25 Series Fryers Replacement Parts for All IF-25 Models, printed on or about Feb. 7, 2014, 2 pages.
IF Series Fryers Replacement Parts for All IF Models, printed on or about Feb. 7, 2014, 3 pages.

* cited by examiner

COMMERCIAL DEEP FAT FRYER MACHINE

BLADE A

BLADE C

BLADE D

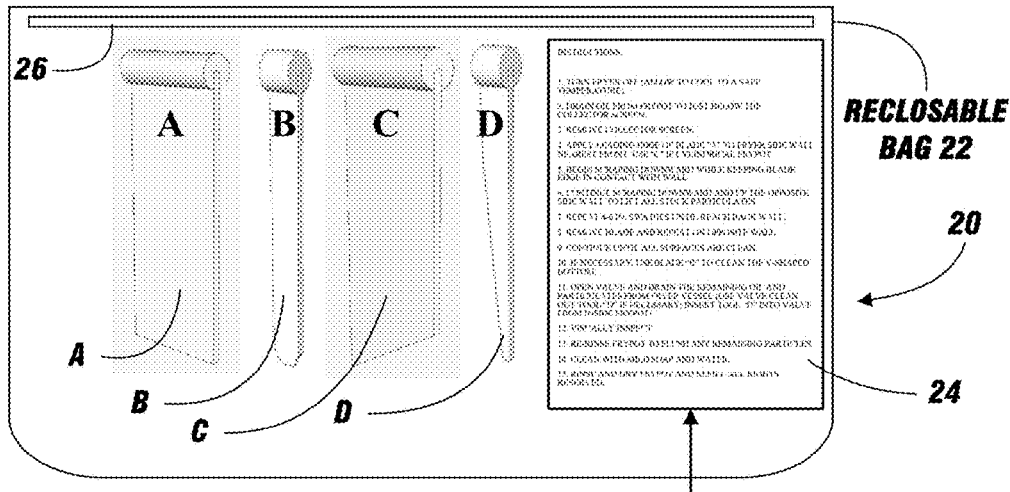

INSTRUCTIONS:

1. TURN FRYER OFF (ALLOW TO COOL TO A SAFE TEMPERATURE).
2. DRAIN OIL FROM FRYPOT TO JUST BELOW THE COLLECTOR SCREEN.
3. REMOVE COLLECTOR SCREEN.
4. APPLY LEADING EDGE OF BLADE "A" TO FRYER SIDE WALL NEAREST FRONT. USE "C" IF CYLINDRICAL FRYPOT.
5. BEGIN SCRAPING DOWNWARD WHILE KEEPING BLADE EDGE IN CONTACT WITH WALL.
6. CONTINUE SCRAPING DOWNWARD AND UP THE OPPOSITE SIDE WALL TO LIFT ALL STUCK PARTICULATES.
7. REPEAT 4-6 IN. SWATHES UNTIL REACH BACK WALL.
8. REMOVE BLADE AND REPEAT ON OPPOSITE WALL.
9. CONTINUE UNTIL ALL SURFACES ARE CLEAN.
10. IF NECESSARY, USE BLADE "B" TO CLEAN THE V-SHAPED BOTTOM.
11. OPEN VALVE AND DRAIN THE REMAINING OIL AND PARTICULATES FROM FRYER VESSEL (USE VALVE CLEAN OUT TOOL "D" IF NECESSARY; INSERT TOOL "D" INTO VALVE FROM INSIDE FRYPOT).
12. VISUALLY INSPECT.
13. RE-RINSE FRYPOT TO FLUSH ANY REMAINING PARTICLES.
14. CLEAN WITH MILD SOAP AND WATER.
15. RINSE AND DRY FRYPOT AND REFILL ALL RIGHTS RESERVED.
© ALL RIGHTS RESERVED

*FIG. 3*

FRYER PAN

APPARATUS AND METHOD FOR CLEANING AND MAINTAINING DEEP FAT FRYERS AND SIMILAR DEVICES

CROSS-REFERENCE TO RELATED APPLICATIONS

This application claims priority under 35 U.S.C. § 119 of a provisional application Ser. No. 61/937,096 filed Feb. 7, 2014, which application is incorporated by reference in its entirety.

BACKGROUND OF THE INVENTION

Commercial deep fat fryers may use gas or electricity as the heat source. The electric type fryer may utilize a fixed heating element or a swing-up heating element. Gas type fryers may utilize heat tubes or be of a broaster style fryer wherein the frypot is heated from the outside. Most fryers tend to use stainless steel or carbon steel for the cooking area. This apparatus and method may be utilized for any type of deep fat fryer and frypot material. The food cooking area is generally referred to as a frypot, although fry pan, vat, tub, etc. may be used.

Commercial natural gas or LP deep fat fryers generally have a stainless steel frypot for the cooking oil which has a "V-shaped" bottom portion (cool zone) and a rectangular top portion (fry zone). Most gas fired deep fat fryers have heat tubes which span the length of a rectangular shaped mid-portion. Such heat tubes allow for a large heat transfer area to heat the oil quickly. This produces a better tasting product with less oil absorption and faster recovery to desired temperature. The tubes are slightly above the V-shaped bottom, thus creating a relatively large cool zone. The cool zone allows heavily breaded crumbed foods such as onions, okra, mushrooms, chicken and fish to settle out. The large cool zone captures particles and holds said particles out of the fry zone and keeps them from carbonizing which reduces taste transfer to the cooking food. A tube-style frypot is more difficult to clean than an open frypot, but the tubes allow easy access to the heat source. Thus, regular cleaning and/or filtering is/are required including removal of the oil through a drain (generally near the bottom of the cool zone). Some other deep fat fryers have different configurations. An example is a broaster. They tend to have cylindrical sidewall frypot with a conical bottom. But they have issues analogous issues.

The enemies of frying oil are air, heat, moisture, food particles, trace metals and cleaning agents. Exposure to air oxidizes frying oil. Oil oxidizes faster at higher temperatures. Contact with moisture is considered the largest culprit in the deterioration of cooking oil. Food particles, as well as trace metals from chemicals or alloys that come in contact with frying oil, promote oxidation and polymerization by introducing both reactive and non-volatile compounds. Frequent filtration of the oil will reduce the negative effects of these contaminants. Caustic sodas and other chemical traces left over from cleaning agents also contribute to the early breakdown of frying oil.

Conventional cleaning methods include the following: Vacuum methods use large, robust, and expensive machines to vacuum the oil out of the fryer. This tends to also vacuum out non-oil components such as crumbs, and other food remnants. Many times this requires hiring a company that specializes in this process, which can add cost and complexity to keeping the fryers maintained. An alternative is for the owner of the fryer, or the owner's employees, attempt to clean the fryer by hand and refill it with oil. This raises issues about whether or not the owner or employee has the skill and tools to do an adequate job.

Another cleaning method is a mobile high pressure washer system which filters and pressure cleans the frypot using the recycled hot oil. The user will scrub the frypot with various tools while directing a spout or nozzle towards any particulates and rinsing said particulates towards the drain. Like the vacuum method, this method can be expensive and may require hiring the job out, and can have obvious safety concerns related to the hot oil splatter.

Another widely used cleaning method utilizes a chemical bath to clean the frypot. The oil is drained and the frypot is filled with water and a chemical solution is added. A minimum soak time is generally 2 hours to overnight. The frypot is then scrubbed and the solution drained. The frypot must then be thoroughly rinsed and dried. Other chemical solutions are sometimes brought to a boil before scrubbing can occur. This can also add expense, may require hiring out, and requires careful handling of chemicals.

Even with the above methods and systems sometimes debris along the inner walls or at the bottom of the V-shape remains. In that case, you still have to drain the oil and then try to scrape or remove particles. Typically a metal spatula might be used to try to scrape and disrupt the debris. However, the particles can congregate and be difficult to remove especially after the oil is removed. The particles are like sand and pebbles that have settled in a bucket. When the water is removed, the sand and pebbles remain. Only when the sand and pebbles are suspended in solution can they be poured from the bucket. It is difficult to reach all necessary areas and navigate around fryer structures like heat tubes and sensors embedded or mounted along the walls with spatulas or other kitchen utensils. And care must be taken not to scratch or abrade the fryer walls. There is room for improvement in this area.

SUMMARY OF THE INVENTION

This apparatus and method for cleaning and maintaining deep fat fryers and similar devices allows for easier cleaning, cheaper cleaning, more efficient cleaning, energy savings, better cleaning, and quicker cleaning. Better cleaning means food tastes better.

One aspect is an overall method that essentially drains part of the oil when cleaning the machine, uses a tool from the top to agitate collected solids and particles collected at the cool zone to lift and suspend them into the remaining oil; and then drain the remaining oil which normally will effectively remove the remaining oil and the solids.

Another aspect is a specific tool to agitate and lift the solids. The tool includes an elongated blade that has material properties that allow it to withstand the temperatures of the oil (even when cooled from its normal frying temperature), enough rigidity to scrape along the cool zone sidewalls, but then flexibility to hit the bottom and then start traveling back up the other side. A handle along a distal edge provides a grip for control and stability for the user for the elongated flexible blade.

Another aspect is a kit that includes a tool with a wide blade, another tool with a narrower blade optionally including a v-shaped tip that can be moved right along the bottom of the cool zone, a package to contain the tools, and instructions in the package, on the package, or on the cleaning tool as to how to use the kit. Optionally this could be the maintenance method described earlier. The kit may also include a drain valve clean out tool and a tool for non-heat tube type fryers.

These and other aspects, objects, features and advantages of the invention will become more apparent with reference to the accompanying specification.

BRIEF DESCRIPTION OF THE DRAWINGS

FIG. 3 is a diagrammatic view of a cleaning tool kit according to one aspect of the invention.

DETAILED DESCRIPTION OF EXEMPLARY EMBODIMENTS

For a better understanding of the invention and its aspects, examples of embodiments it can take will now be described in detail. These examples are neither inclusive nor exclusive of all forms and embodiments the invention can take.

Figure 1:
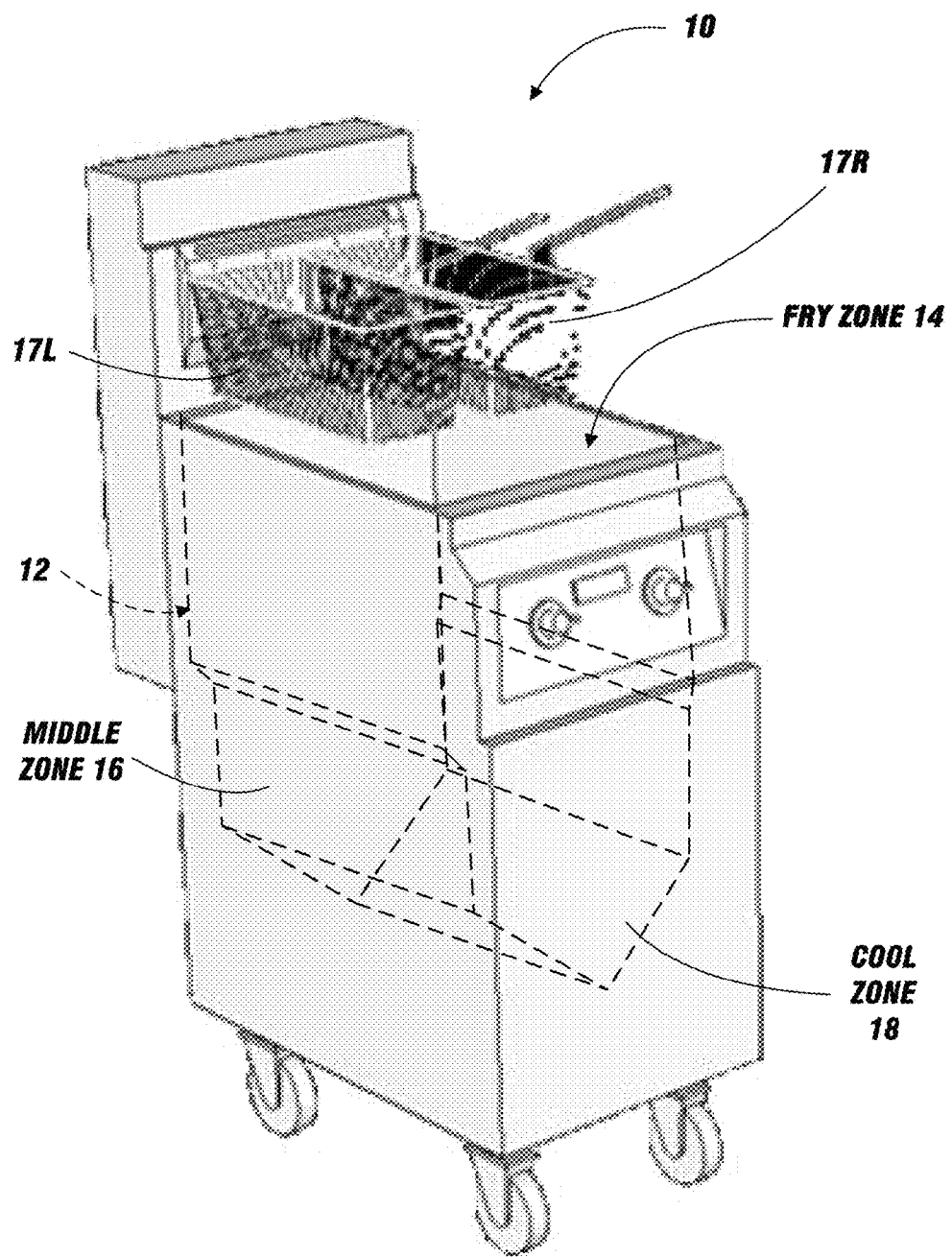
FIG. 1 is a scale-size perspective view of a typical commercial deep fat fryer.
Figure 6:
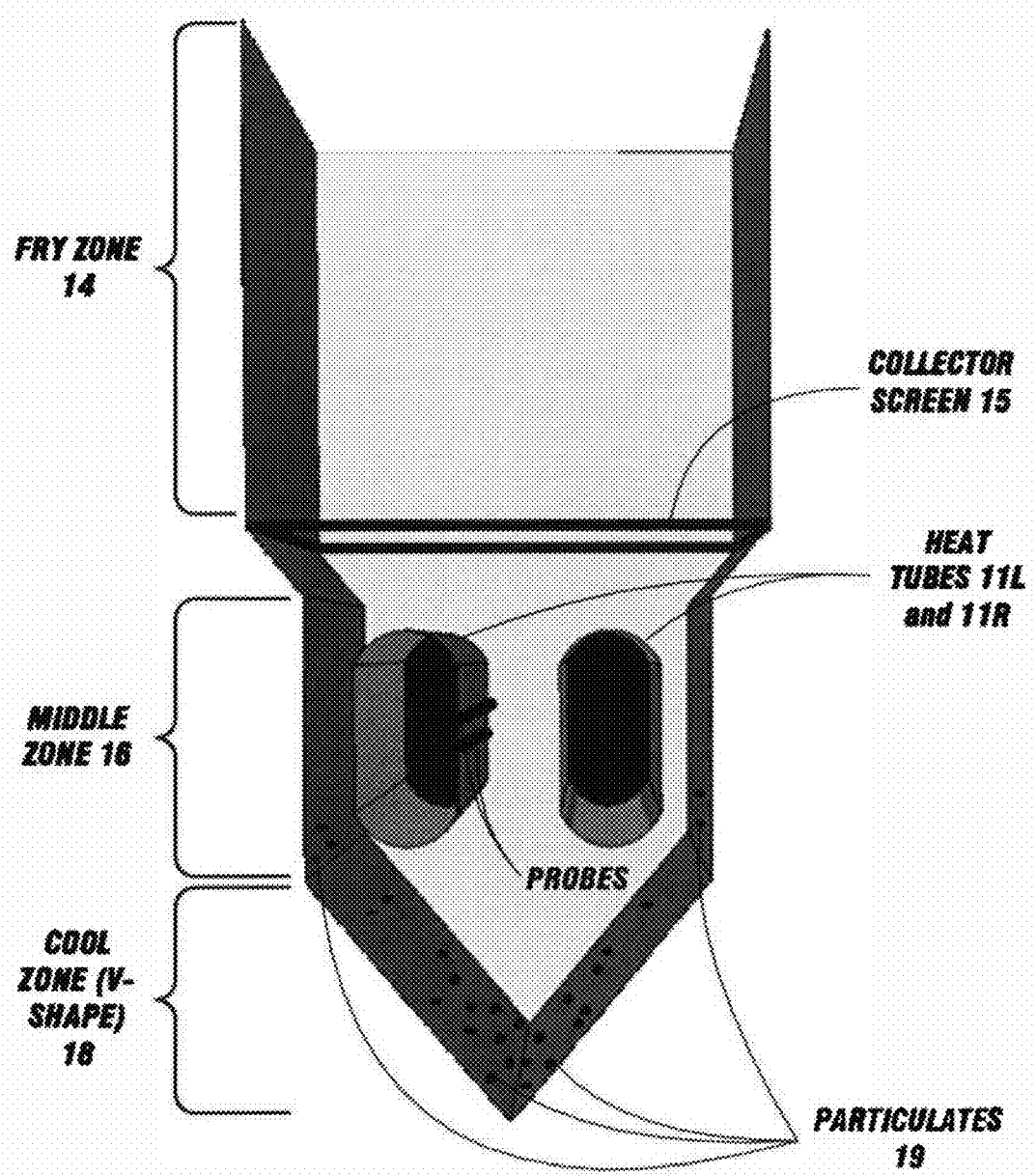
FIG. 6 is a slightly enlarged sectional front view taken along line 6-6 of FIG. 5.
Figure 7:
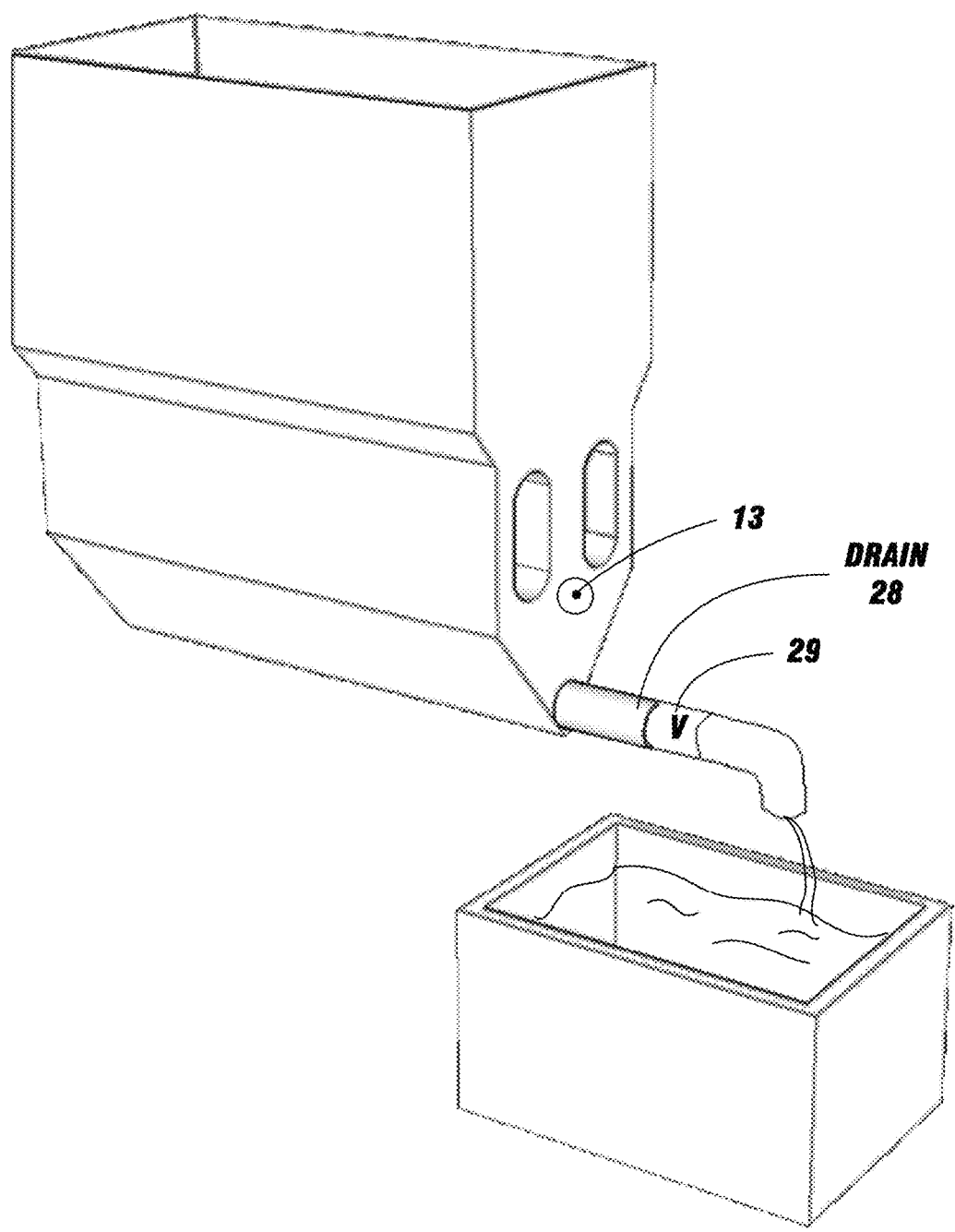
FIG. 7 is a perspective view of a deep fat fryer frypot similar to FIG. 5 but including an oil drain receptacle.

Shown in FIG. 1 is a typical deep fat fryer (shown generally at reference number 10). The particular deep fat fryer is model number IFS-25, manufactured by and commercially available from Imperial Range of Corona, Calif. USA. This particular deep fat fryer has a 25 lb. (14 L) oil capacity stainless steel frypot 12. The frying area or zone 14 of frypot 12 is 7⅞" wide×14" long×6¾" deep. Directly below the frying area 14 are two spaced but parallel heat tubes 11L and 11R (see, e.g., FIG. 6) which span the length of the frypot 12. Below the heat tubes 11 is a v-shaped bottom which creates a cool zone 18. The working depth for this particular deep fat fryer is 30" (to the bottom of the V-shape 18). This unit has full thermostat control from 200° F.-400° F. via one or more thermostats or probes (one is diagrammatically illustrated at reference number 13 in FIG. 7). A middle zone 16 exists which is narrower across than fry zone 14 exists in this fryer 10 and thus has a step-down (narrowing) angled transition between them (as seen in the FIGURES). Typically a deep fat fryer will be operated at 350° F. A fine mesh collector screen 15 is positioned above the heat tubes 11 and directly below the fry baskets 17L and R which are dropped into fry zone 14 (see FIG. 1). During the process of frying, heavily breaded food crumbs will flake off and a small percentage will fall through the collector screen 15 and sink into the cool zone 18. Over time the crumbs will buildup in the cool zone thus requiring regular cleaning. See diagrammatic representation of particulates 19 in FIG. 6.

FIG. 3 illustrates a proposed cleaning kit (referred to collectively at reference number 20) which includes one blade "A", one blade "B", one blade "C", and one blade "D" enclosed inside a sealable see-through, reusable pouch, bag, rack, packaging, or other device 22 for storing the tools. Alternatively the kit could include just one or two of those blades. For example, it could include just blade A or just blades A and B. It could contain A and C, A and B and C, A and D, A and C and D, or B and C and D. It could contain other things (e.g. a towel, rag, wipe, bottle of cleaner or water, gloves or other). The pouch 22 can have instructions 24 printed on the outside (or loose leaf on the inside) for the user allowing first time or less skilled workers to utilize the tools in kit 20. The pouch 22 may include a device to allow for hanging or affixing to a wall near the fryer (not shown—e.g. a hook, aperture, hook and loop fastener, strap, etc.). It could include a zip lock or other re-closable fastener 26. The kit may also be just the large blade tool A with the instructions printed directly or otherwise applied on it (e.g. without a pouch 22).

Figure 8A:
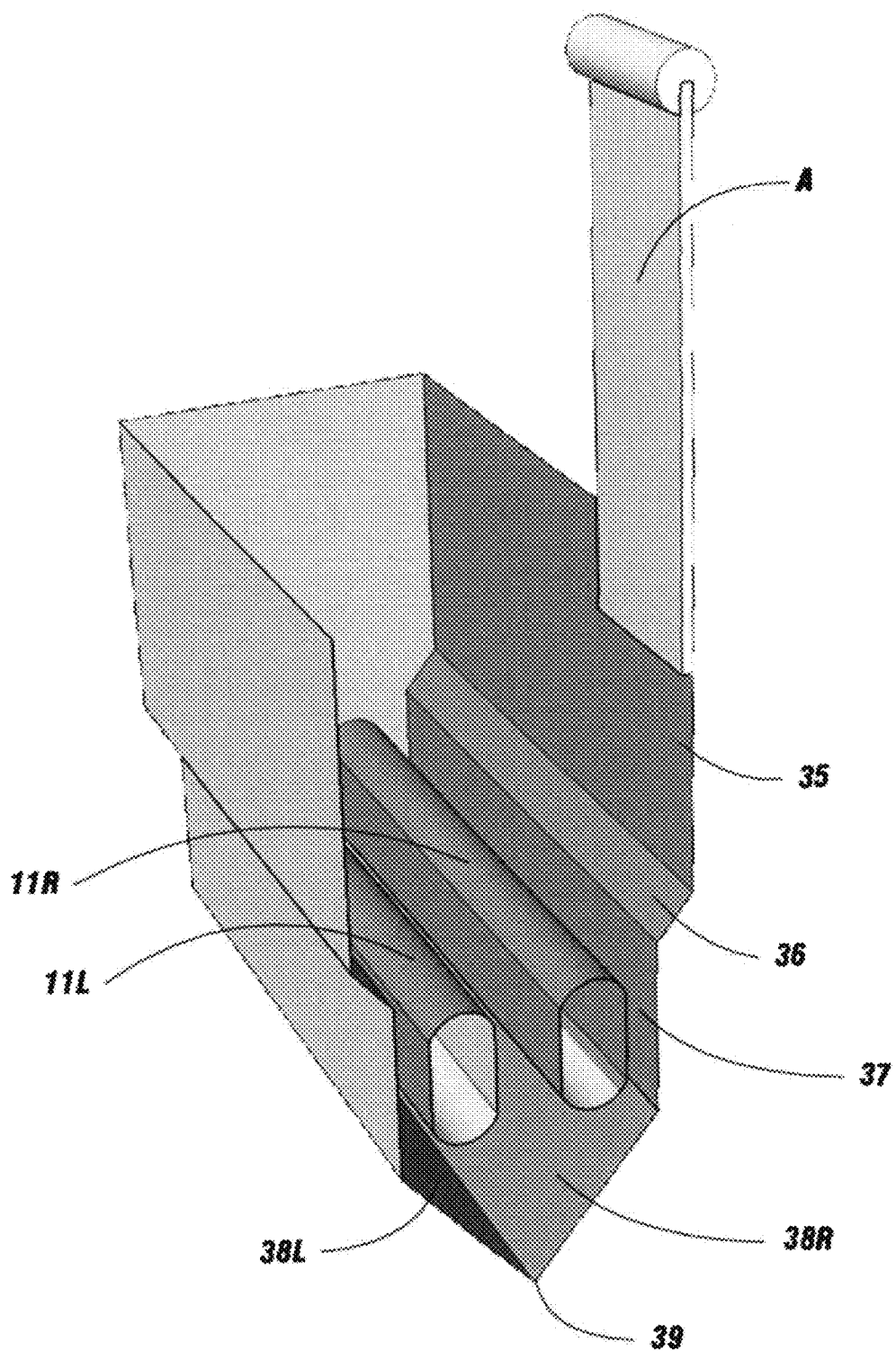
FIG. 8A is a perspective sectional view taken along line 6-6 of FIG. 5 showing a large cleaning tool blade in a first position for scraping.
Figure 8B:
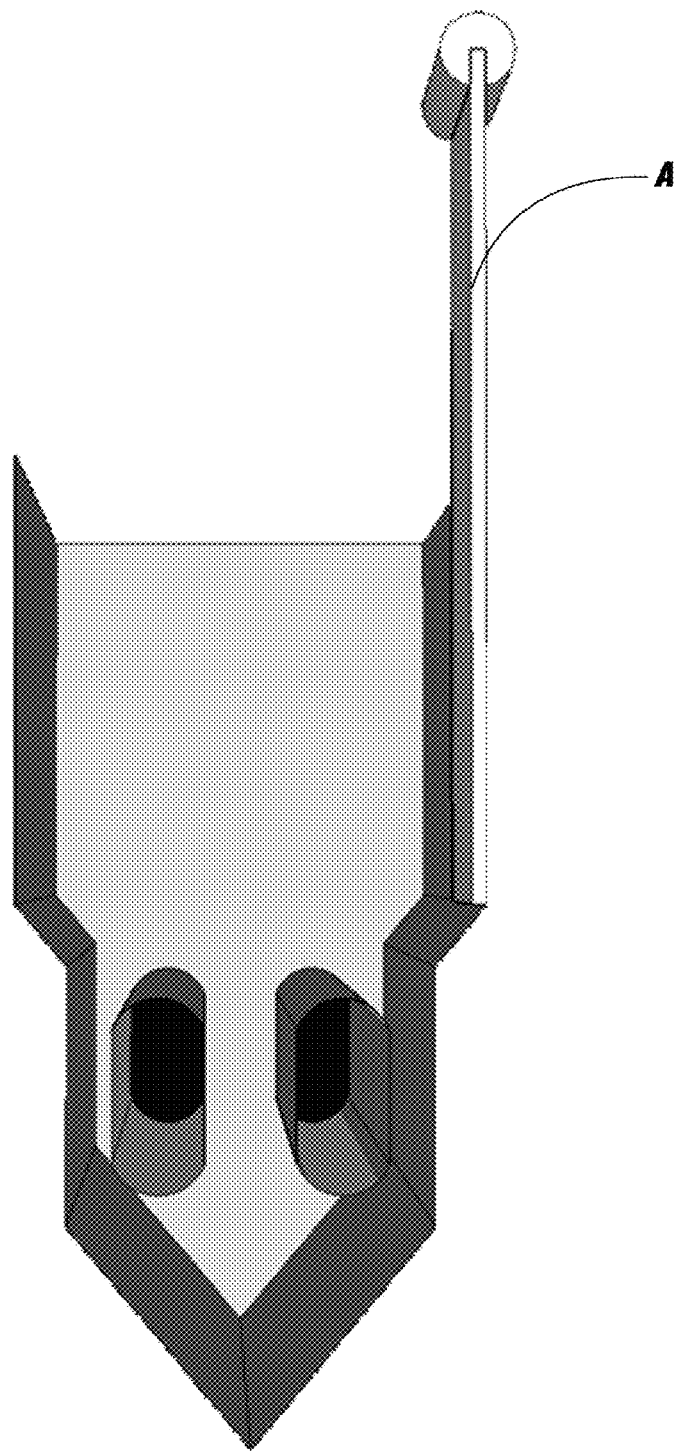
FIG. 8B is the view of FIG. 5 showing the large cleaning tool blade in a second position for scraping.
Figure 8C:
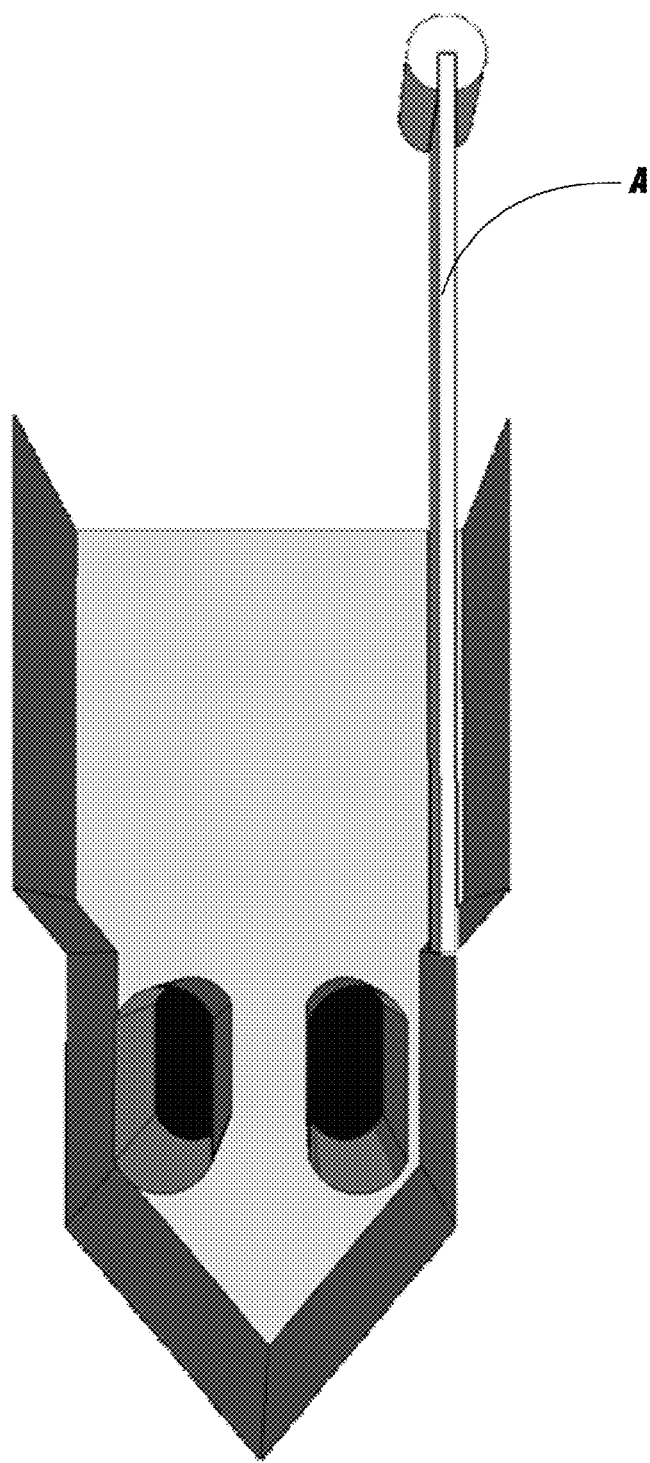
FIG. 8C is a perspective view of FIG. 6 showing cleaning tool blade in a third position for scraping.
Figure 8D:
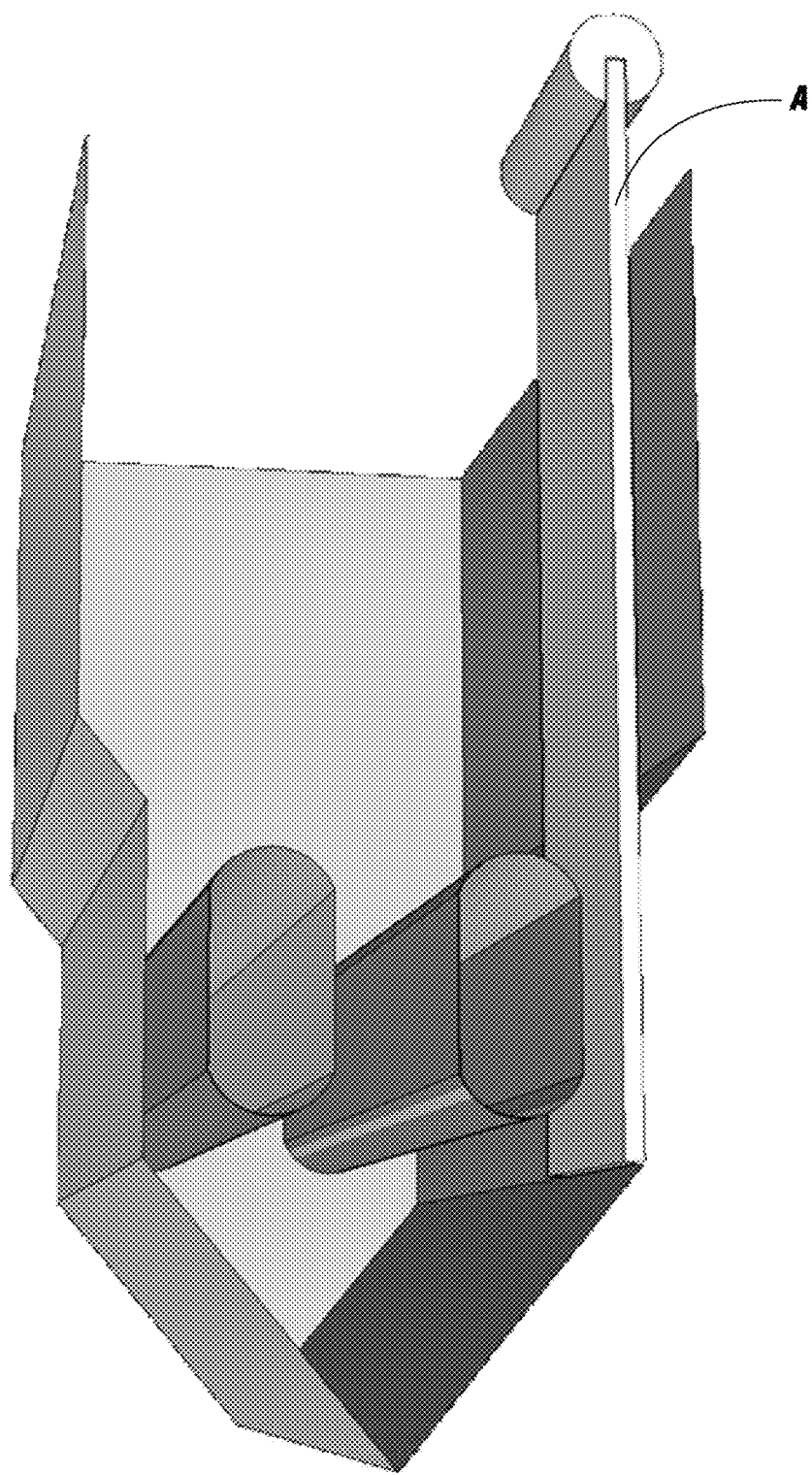
FIG. 8D is a perspective view similar to FIG. 8A showing cleaning tool blade in a fourth position for scraping.

Utilizing the blades from the kit 20 can reduce the frypot cleanup to a fraction, e.g. 75%, the total time typically needed for the power wash method, the vacuum method, or chemical bath method described earlier. The power wash and vacuum cleaning methods can take 1 hour or more to complete. The various chemical bath methods are a minimum 2 hours to overnight for completion. Using at least blade A might take less than an hour. For example, approximately 45 minutes or less has been found to be typical. Also using blades B and D can be done in substantially the same time frame and can enhance the cleaning. Blade C is most relevant to broasters or other fryers that have more of a cylindrical fry zone and conical cool zone. See, for example, FIG. 8H. The angled leading edge 51 of Blade C can scrape the interior walls of both zones and is particularly useful around the conical bottom cool zone.

Figure 4A:
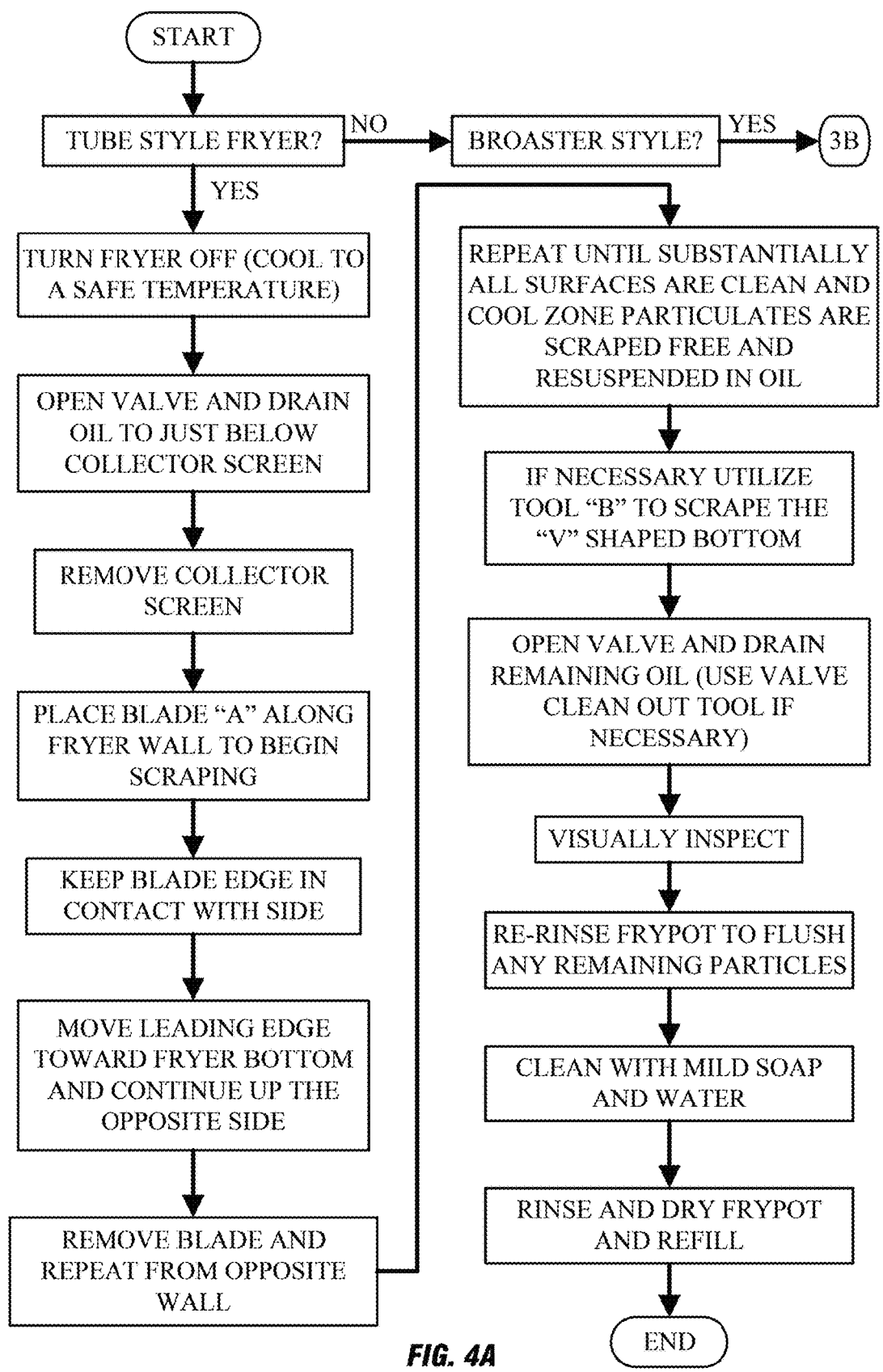
FIG. 4A is a flow chart illustrating a method for cleaning a tube-fired deep fat fryer according to one aspect of the invention.
Figure 4B:
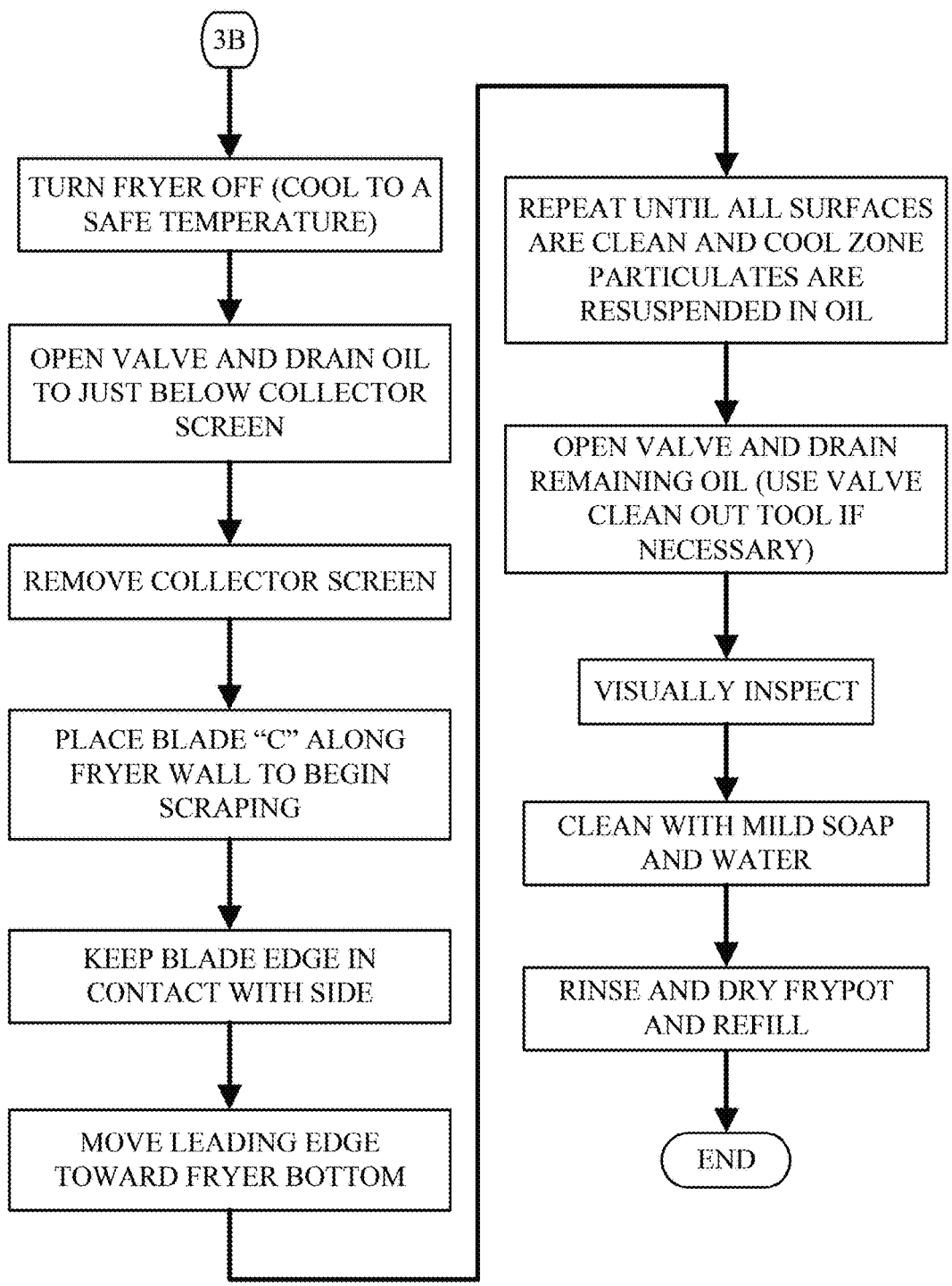
FIG. 4B is a flow chart illustrating a method similar to FIG. 4A but for cleaning a broaster style deep fat fryer.
Figure 5:
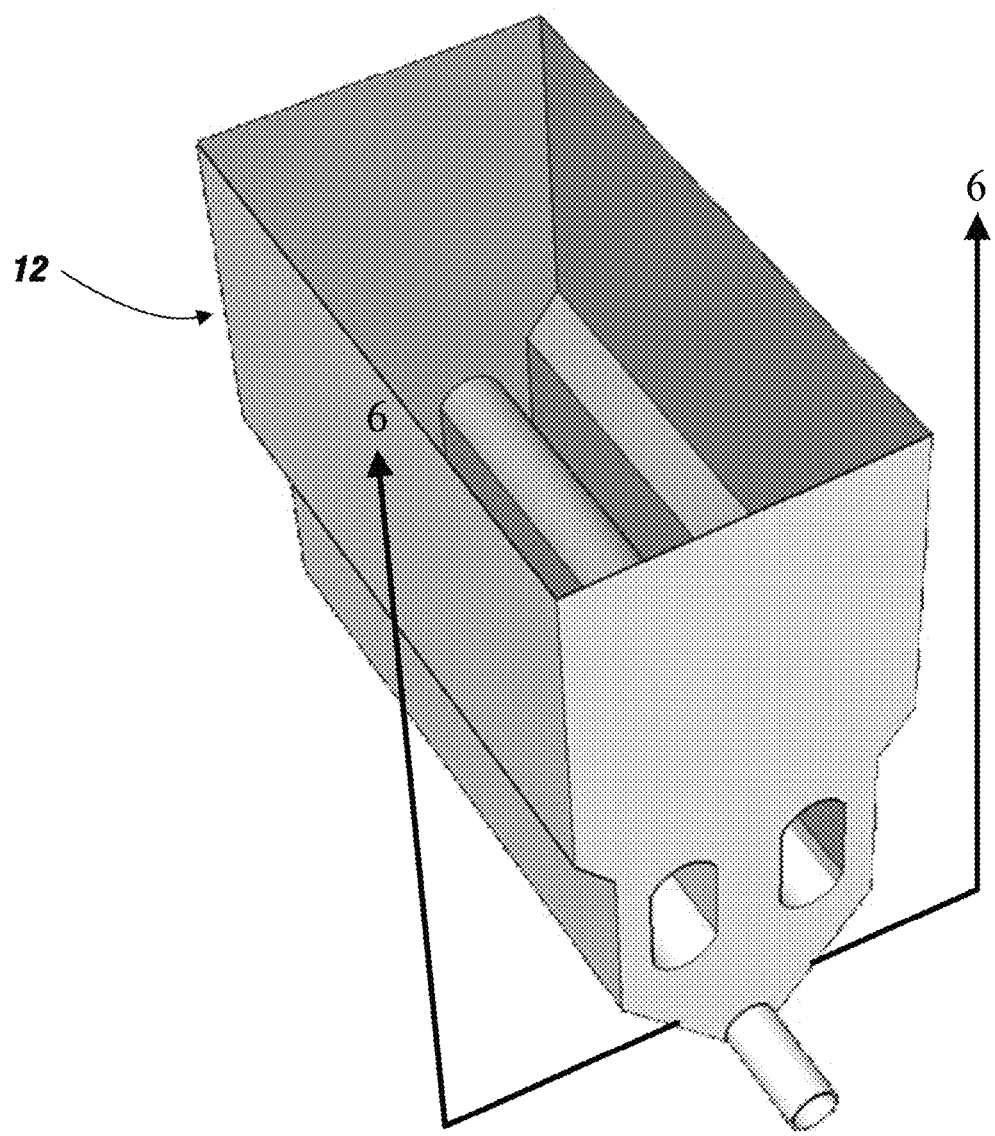
FIG. 5 is a scale-size perspective view of a deep fat fryer frypot in isolation from the remainder of FIG. 1.
Figure 8E:
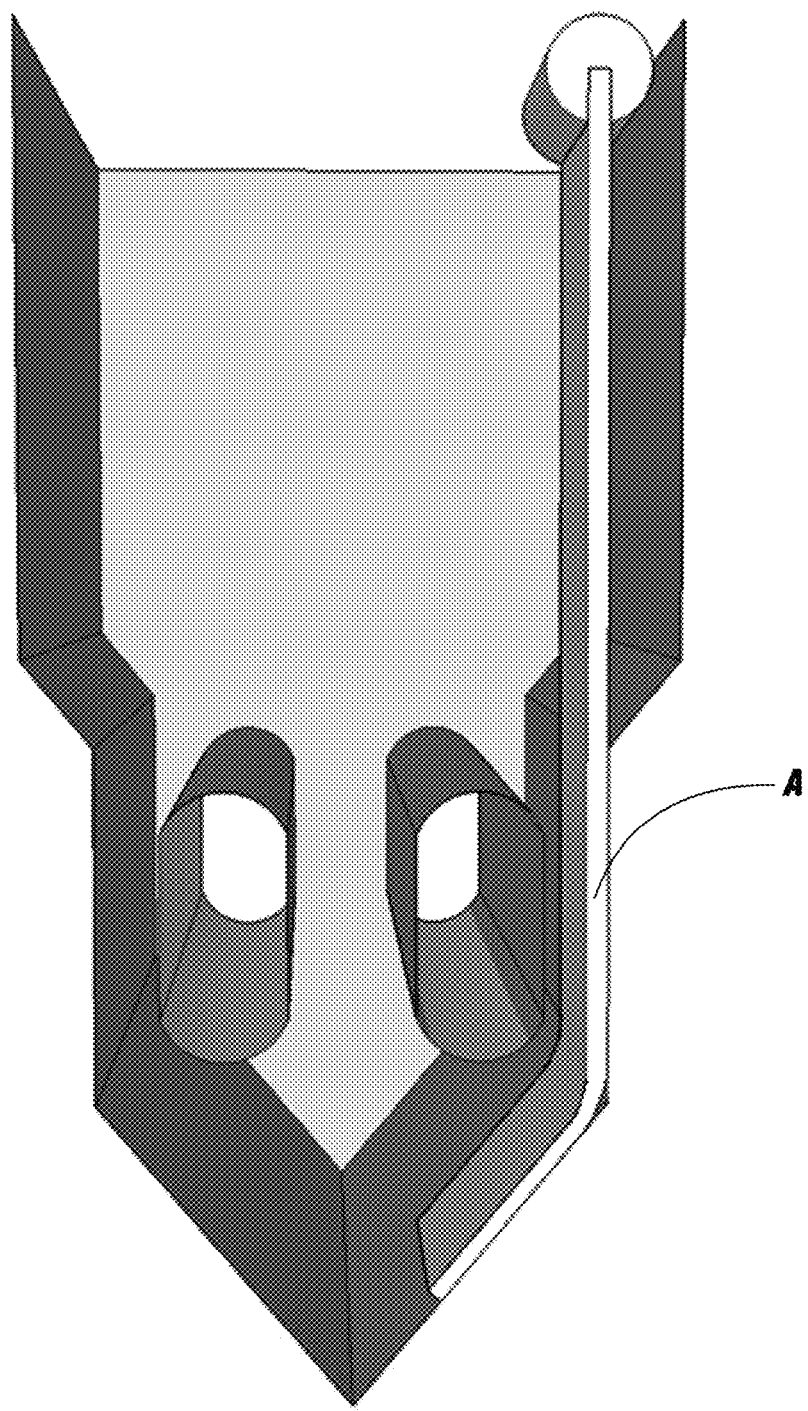
FIG. 8E is a perspective view of FIG. 6 showing the large cleaning tool blade in a fifth position for scraping.
Figure 8F:
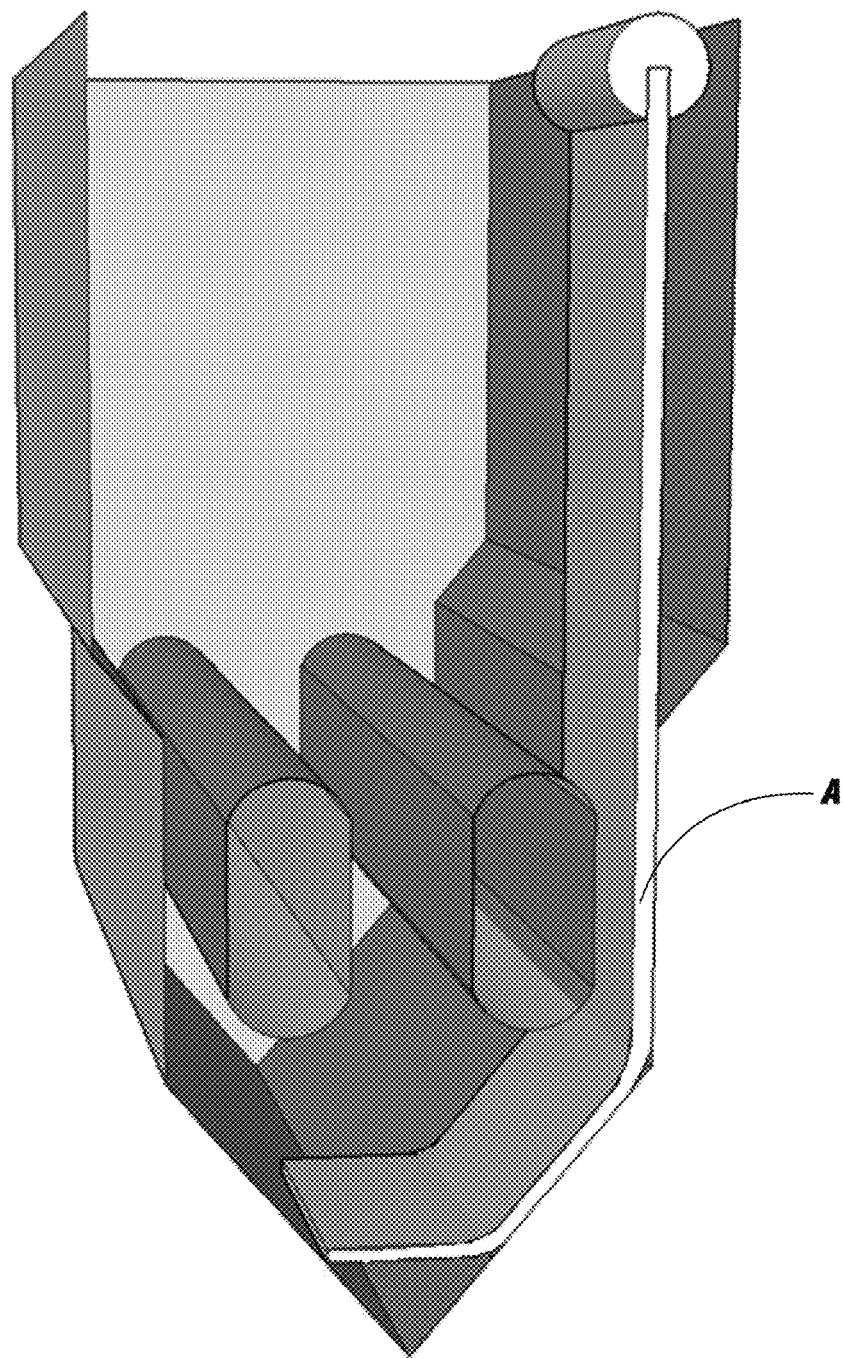
FIG. 8F is a perspective view similar to FIG. 8A showing the large cleaning tool blade in a sixth position for scraping.
Figure 8G:
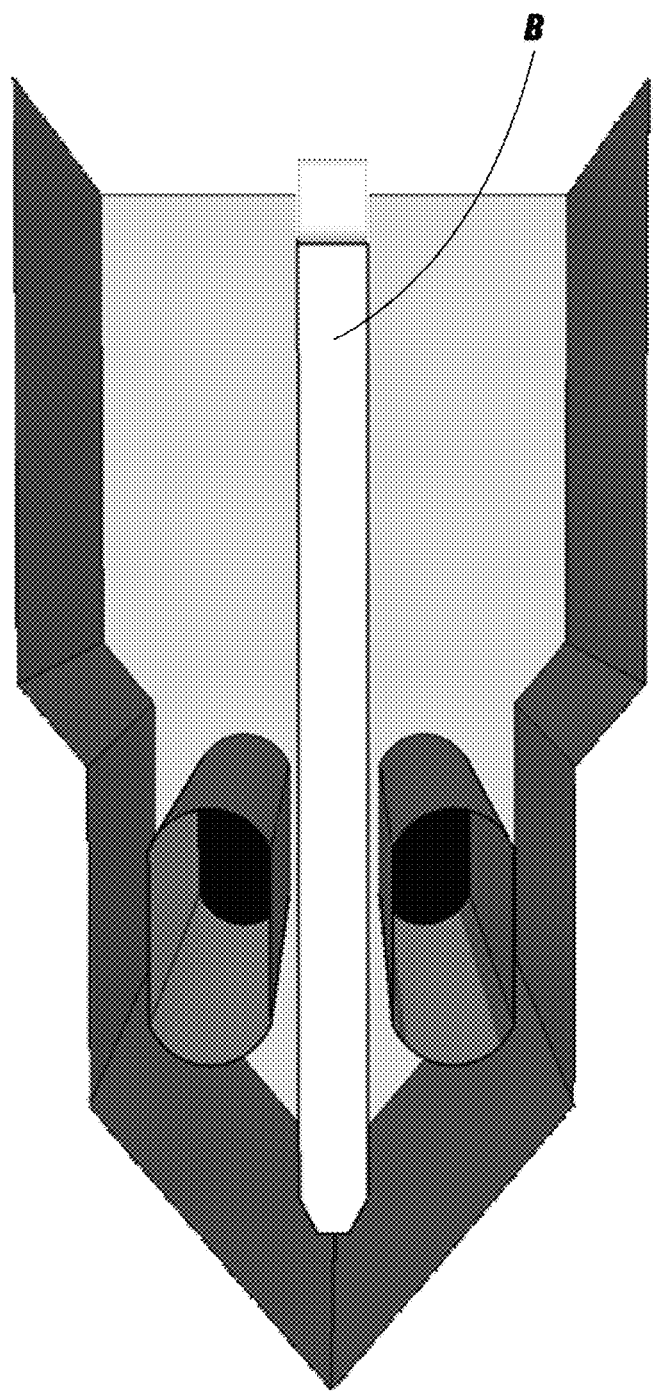
FIG. 8G is a perspective view of FIG. 6 showing the small cleaning tool blade within the V-shaped frypot bottom for scraping along the very bottom of the cool zone.
Figure 8H:
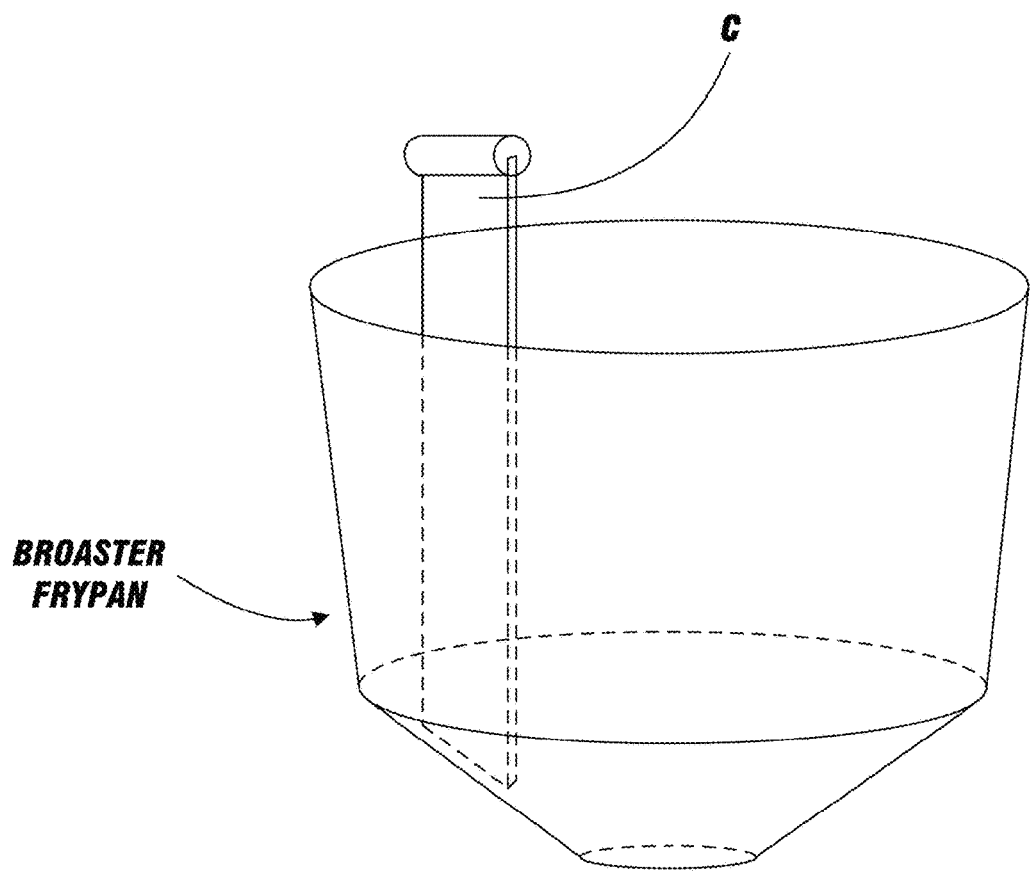
FIG. 8H is a diagrammatic view of a broaster-type frypot and the tool of FIG. 2D relative to it.

Refer to FIGS. 4A-B for one exemplary method. Turn fryer 10 off and allow cooling to a temperature lower than operating temperatures (e.g. 150° F.-170° F.). It is to be understood that use of the embodiments with deep fat fryers, broasters, and the like should be done with prudence considering that the oil can be at temperatures elevated above room temperature. For example, it is generally prudent to allow at least some cooling of the oil from normal operating temperatures before using the invention. This could allow the oil to cool to lower temperatures (e.g. 110°-150° F.) or the like. The user of the invention would utilize their best judgment. Further caution is concerned with the internal components of most frypots, i.e., probes, sensors, thermostats, which can be damaged when contacted by the forceful use of the cleaning tool, see FIG. 7. Open valve 29 in drain pipe 28 and drain oil from frypot 12, refer to FIG. 7, to just below the collector screen 15, see FIG. 6, and remove the collector screen 15. Apply leading edge 3132 of wide blade A to one fryer interior side wall 35, refer to FIG. 8A. Begin scraping downward while keeping blade edge 32 in contact with the frypot wall towards the heat tube zone 16 (and avoiding hitting the tubes or probes/sensors, see FIGS. 6 and 7), refer to FIG. 8B. This might require the blade forming an angle with the vertical plane of fry zone 14 side wall 35. Scraping through the heat tube zone 16, refer to side wall portions 36 and 37 of FIG. 8A and to FIGS. 8C-D, downward toward side wall 38R of the cool zone 18 all the way into v-shaped bottom 39, refer to FIG. 8E, and up a distance on the opposite side 38L, refer to FIG. 8F, until all stuck particulates are re-suspended in the oil. It is to be understood that these FIGURES, including FIGS. 8E and 8F, are diagrammatic because there may be bowing or curvature of the blade and not hard angles once leading edge goes past a transition like angled side wall portion 36 between fry zone 14 and middle zone 16, and the V-shape 38R, 39, 38L of cool zone 18. The blade becomes more flexible in the warm oil allowing it to easily move to the bottom 39 of the V-shape and then up the bend on the opposite side wall 38L (typically between 30-45 degrees), yet will return to its original shape when removed from the oil. This covers a first section of side 35, 36, 37, 38R, 39 at the front of frypot 12. Continue the process along the same side wall the number of times necessary to scrape along the entire front-to-back depth of frypot 12. Remove cleaning blade A and repeat the scraping and agitating action on the opposite fryer wall. Continue this method until all surfaces are cleaned and the particulates are re-suspended. If necessary, use blade B to further clean the v-shaped bottom 38R, 39, 38L, scraping along its length away from the drain, refer to FIG. 8G. The V-shape distal end or tip of blade B can be formed to be identical or close to the V-shape of the bottom of the fryer cool zone. Or the tip could be a more acute angle. Or, as shown at FIG. 2C it can have a flat leading edge 41 with angled back opposite sides 42R and L. Open the valve 29 and drain the remaining oil and newly suspended particulates from frypot 12. The majority of the particulates will easily flow out the drain 28 (use the drain valve clean out tool D if necessary, refer to FIG. 2E). Flush again if necessary with water or old oil. Visually inspect the frypot for any remaining particles. Clean the frypot with mild soap and water being careful not to disturb the temperature probes. The frypot is now rehabilitated. Close the drain, replace the collector screen and add new oil or filtered oil to the frypot, refer to FIGS. 4A-B.

In one embodiment, the blades, refer to FIGS. 2A-D, are made from laminated Fiberglass Reinforced Plastic (FRP) panels. The laminated FRP panels are believed to meet all USDA, FDA, and Agriculture Canada standards. FRP laminates are available in a variety of colors, textures and thicknesses. FRP performs exceptionally in a multitude of applications, is accepted by the USDA, FDA, and Agriculture Canada, and provides an extremely durable finish that is ideal for high impact and heavy abuse areas. The panels come in various sizes: 4'×8', 4'×10', and 4'×12'. The panels are also available in various thicknesses: ⅛", ¼", ⅜", ½", ⅝", ¾", ⅞", and 1". Other physical characteristics are: Flexural Strength=17,000 psi; Flexural Modulus=$6.9 \times 10^5$ psi; Tensile Strength=12,000 psi; Tensile Modulus=$9.4 \times 1.0^5$ psi; Barcol Hardness=35; Izod Impact Resistance=6 ft-lb/in notched, Specific Gravity=1.53; Coefficient of Linear Thermal Expansion=$1.6 \times 10^{-5}$ in/in° F.; Water Absorption==0.4%/24 hours@77° F.; Flame Spread Index 200; Smoke Developed Value=450; Fire Rating Class=C/3; Ignition Temperature 650° F.; Compressive Strength 19,000 PSI; Compressive Modulus=$8.0 \times 10^5$. By empirical testing, it has been discovered that at oil temperatures of approximately 150° F., ⅛" thick FRP becomes even more flexible than at ambient room temperature but retains sufficient longitudinal stiffness to function as a scraping blade by manual force exerted via the handle. This increased flexibility promotes the distal edge to more easily follow the fryer wall including the steps and angles. Rules related to the FRP: 1. A thicker material generally equals less flexibility. 2. A thinner material generally equals less longitudinal rigidity. 3. A wider blade generally equals less maneuverability. 4. A narrower blade generally equals less coverage. 5. A taller blade may to be more difficult to manipulate. 6. A shorter blade may not allow the scraping end to follow the V-shape up the opposite side wall.

It is to be understood that such material is available from a variety of commercial vendors. One example is 0.090 inch thick Laminated FRP Panels from Creative Panel Solutions of 46271 184$^{th}$ St., Castlewood, S. Dak., 57223 USA (see www.creativepanelsolutions.com). They come in various colors (including but not limited to white, black, orange, and green). Indicia, information, logos, or other graphics can be placed on the blade or handle (or any kit components). They can be textured or smooth in surface finish. They can be easily cut to size for the tools described herein. At least the foregoing material comes in the following thicknesses: 0.030", 0.040", 0.050", 0.060", 0.075", 0.090" and 0.120". The largest of these approaches ⅛" thick. Another source is Custom Laminated Panels for the Construction Industry from Building Products Inc. of Iowa, P.O. Box 210, Waterloo, Iowa 50704 USA (see wwww.buildingproductsins.com). They are listed as strong and shatter resistance, extremely scratch resistant, thermal shock and chemically resistant, cleanable with steam, detergent and water or high pressure sprayers, stain, odor, and moisture resistant, available in a variety of colors and textures, USDA certified, and Class C (per ASTM-E-84) fire-rated (Class A also available). One particular product is item number CPSWHIT090FRP08, white Texture FRP-Liner Panel at 0.090 inch thickness. Another possible example is the material used in the CHOP & CHOP® flexible cutting mat commercially available from CCI Industries, Inc., 250-A Fischer Ave., Costa Mesa, Calif. 92626 USA (see www-.coolcurtain.com). It would likely be recommended that the thickness be on the order of ⅛".

Figure 2A:
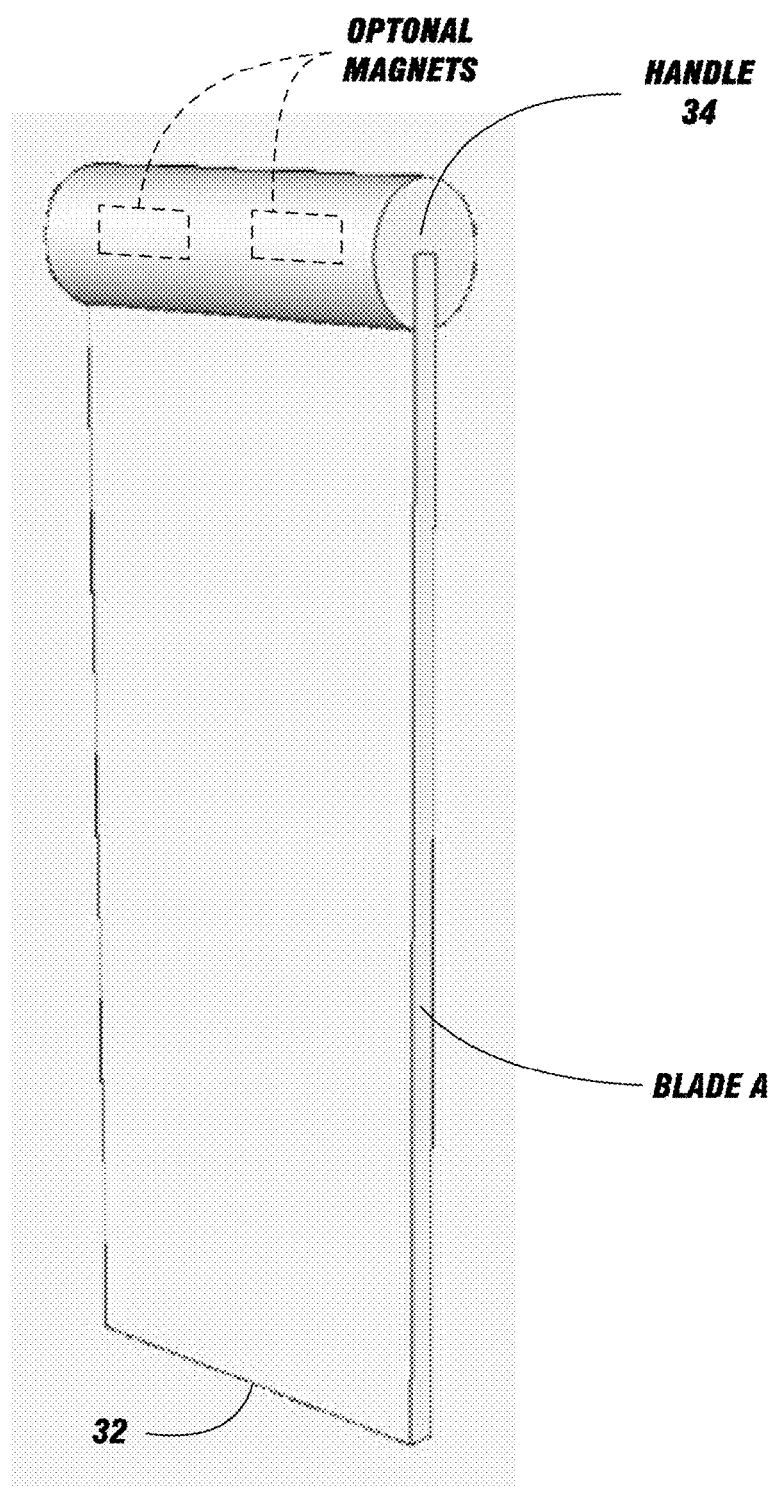
FIG. 2A is a scale-size perspective view of one possible embodiment of a large blade cleaning tool.
Figure 2B:
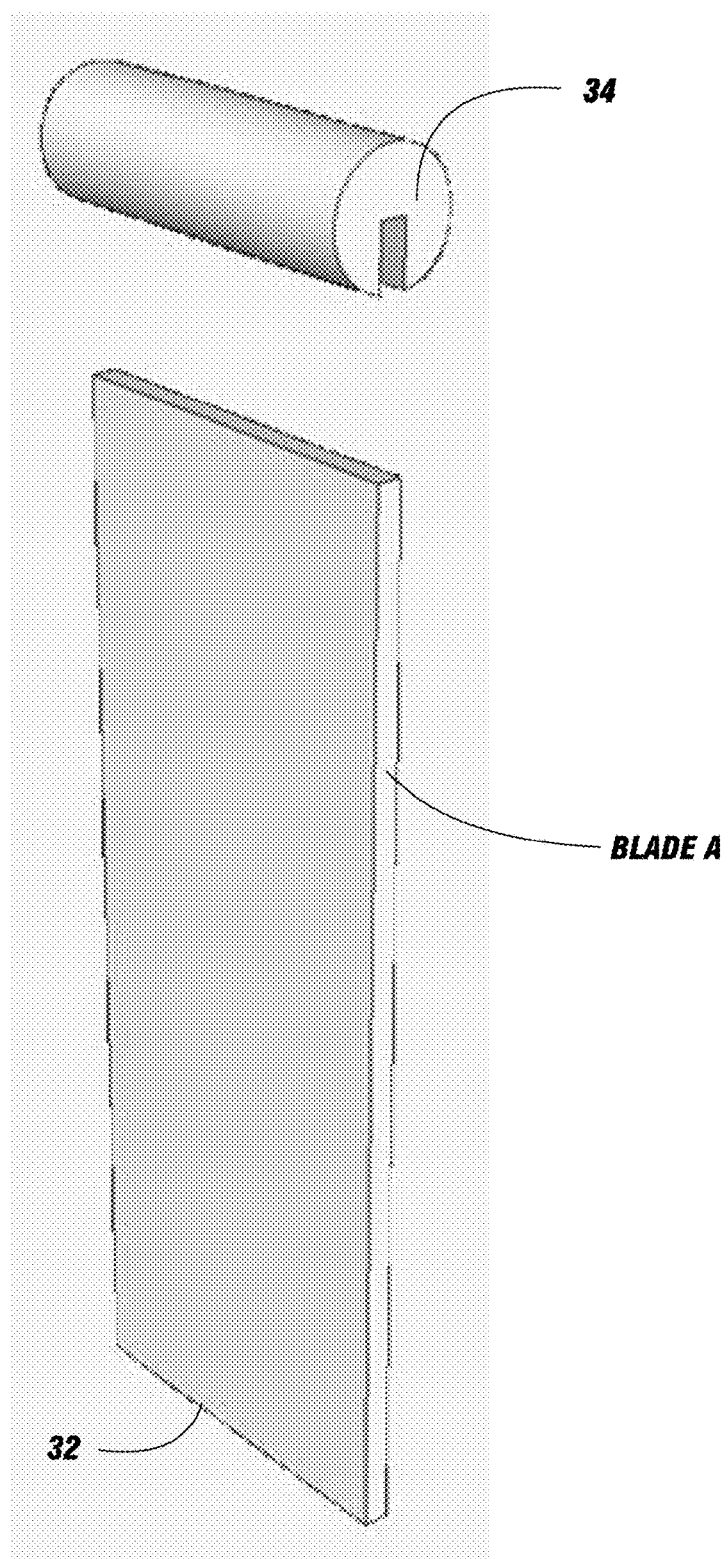
FIG. 2B is a perspective view of the large blade cleaning tool of FIG. 2A exploded from its handle.
Figure 2C:
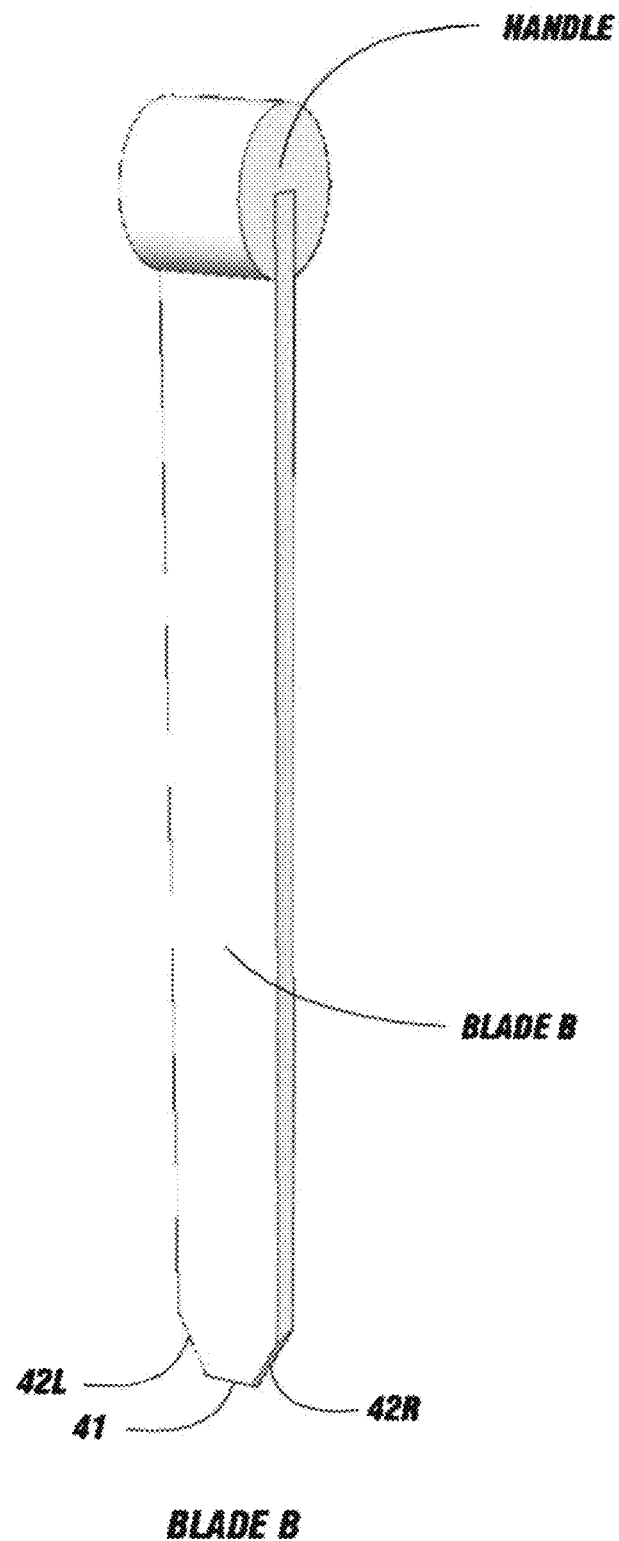
FIG. 2C is a scale-size perspective view of an alternative embodiment of a small blade cleaning tool.

Blade A, refer to FIG. 2B, is 16" long×4" wide×⅛" thick. Other sizes and form factors are possible however. The handle 34 for blade A, refer to FIG. 2B, is 1½" diameter with a ⅛" slot routed at ½ the diameter of handle 34 its entire length to receive the 16"×4"×⅛" blade. The handle 34 may be made from the same material as the blade portion. The handle is attached using an epoxy such as Super Sap, a USDA BioPreferred Certified liquid epoxy resin. The 16"×4"×⅛" blade A, refer FIG. 2B, may be punched out from larger sheets, hand cut using a razor knife, or otherwise formed. All sides maintain perpendicular edges to each other as much as possible. The handle 34 does not extend beyond the blade. This helps the user to mate the side edge to the frypot 12 when scraping for maximum cleaning results. It is to be understood, however, alternative handles are possible. For example, they may be a single piece of wood, plastic, metal, or other material. For another example, each could be two halves of wood or FRP material which is drilled and affixed using nuts and bolts, rivets, or other fasteners. It has be found that materials like FRP or wood have the advantage of being somewhat heat insulative, and thus resist becoming hot when the tool is lowered and manipulated in the remaining oil in the frypot.

It is also to be understood that other materials might be used that have at least similar properties to those described and illustrated herein. The blade material, like the FRP, has a degree of longitudinal rigidity or stiffness that allows manual scraping force imparted at the handle to be transferred to the leading edge of the blade. The leading edge has lateral rigidity, stiffness, and hardness to act as a scraping edge and resists deformation, cracking, shattering, or degradation, even with repeated use in oil of the temperatures described. However, the material has flexibility along its length to allow it to bend enough to present the leading/scraping edge of the tool even at and past transitions such as 35 to 36, 36 to 37, 37 to 38R, 38R to 39, and 39 to 38L shown in FIG. 8A. FIGS. 8E and 8F diagrammatically illustrate that the leading/scraping edge can be maintained flush with the interior of frypot 14 up to these transitions by appropriate manipulation of the tool to get good scraping coverage of the surfaces, but once past a transition can bend and might have a small gap at the transition between the side of the blade and the transition. But the leading edge can still be manipulated by the user to have basically continuous contact and scraping after the transition. And, the discovery that some of these types of materials get more flexible in the hotter than ambient air temperature of the remaining oil (while still retaining leading edge scraping effectiveness) promotes even better and more efficient cleaning. In essence, the blade follows the interior surfaces more closely, at least at the leading edge. The user can try different materials for acceptable properties. Different thicknesses can also be tried and selected by a user for personal preference. Sometimes probes or thermostats and the like have to be avoided (as do fryers with heat tubes). The user can tactilely feel when the leading edge or blade body comes into contact, can withdraw or move the blade over, and continue downward.

It is to be further understood that the generally up and down scraping action of the tool in the remaining oil creates turbulence in the oil that helps suspend the particulates loosened by the scraping in the oil. Oil than can replace where the particulates were adhered to the frypot wall surfaces, in preparation for draining of remaining oil and then final cleaning of those surfaces. In practice, with a frypot of the basic dimensions of the fryer described and a 4" wide Blade A, it has been found that perhaps on average three downwardly advancing scrapes from top to bottom can be sufficient. With a 4 inch wide blade A and an approximate 18 inch front to back frypot, this would take about 4 to 5 passes per frypot side (i.e. about 3 top to bottom scrapes per sidewall section, and 4 to 5 sections equals about 12 to 15 scrape movements a side; or 24 to 30 for both sides of the frypot). This is quite quick, easy, and effective to suspend the encrusted particulates. The relatively continuously action perturbs the oil and tends to disperse and suspend the loosened particulates so that subsequent draining of that remaining oil carries out the loosened particulates as well as deters them from resettling on the interior surfaces. The movement of the tool agitates and churns, which promotes the suspension of the particulates.

Figure 2D:
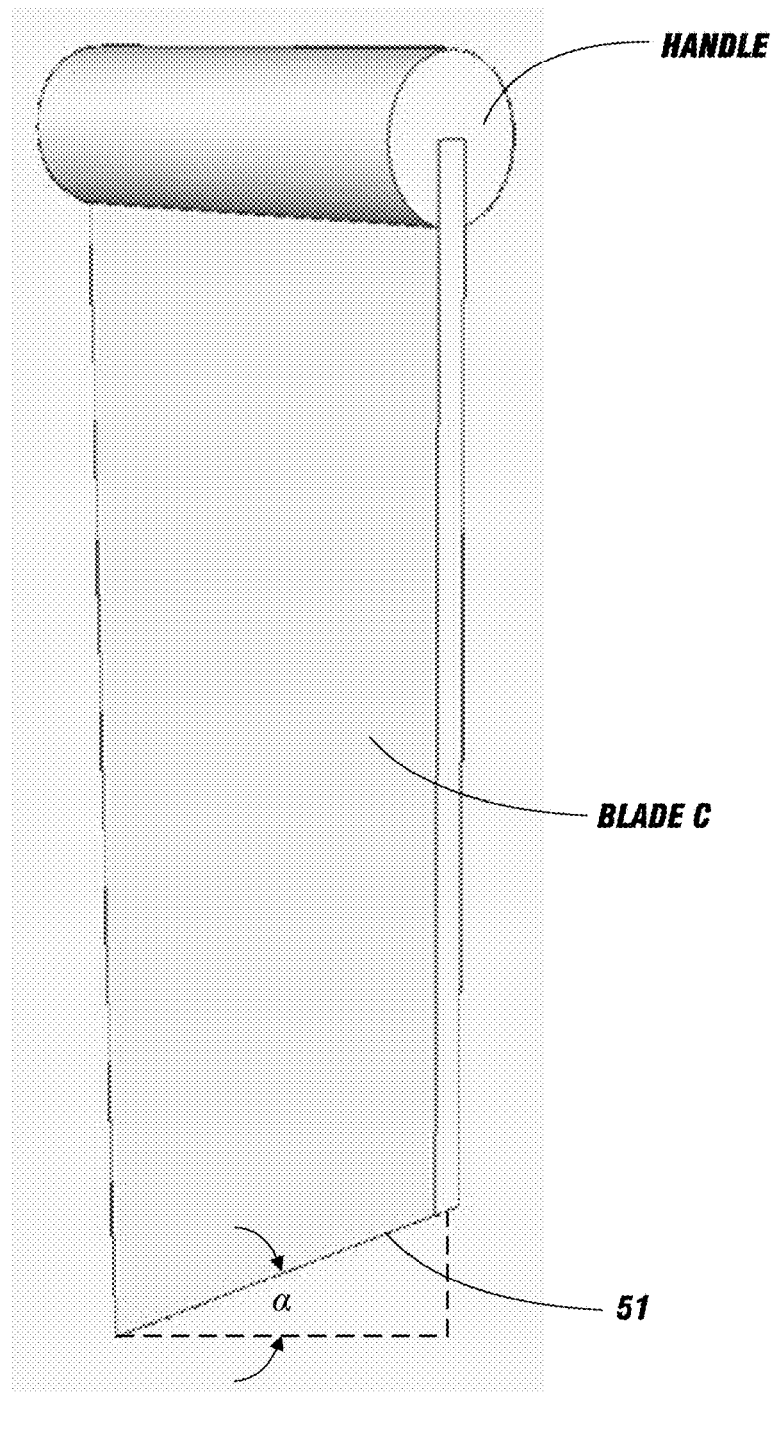
FIG. 2D is a perspective view of an alternative large tool cleaning blade.
Figure 2E:
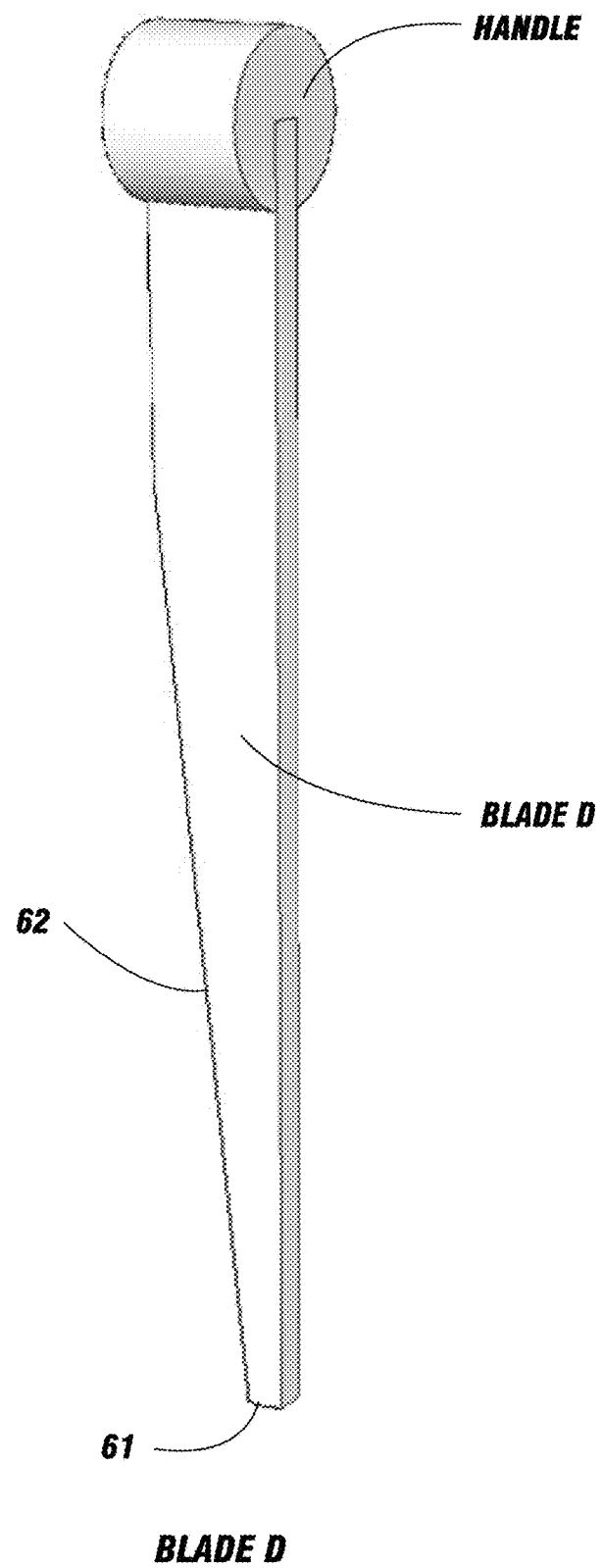
FIG. 2E is a scale-size perspective view of a small blade drain valve clean out tool.

Blade B, refer to FIG. 2C, is 16"×2"×approx. 0.090" with a tip which is pointed down at 42L and 42R to its flat part 41 to match (as close as possible) the v-shaped frypot bottom. The width of blade B is generally narrower than the distance between heat tubes. The shape and dimensions of the blades may differ to match the various manufacturers frypot. Blade B could also be used for smaller flat side wall areas than Blade A, if desired or needed. For instance, FIG. 2D represents a blade C designed for use on a broaster type frypot (e.g. 18"×4"×approx. 0.090"). The scraping end 51 is at an angle α (approx. 30 degrees) to match the cone-shaped walls of a broaster. It could be at a different angle to be complementary to different conical shapes. An example of a cone-shaped frypot is model 1600 commercially available from Broaster of Beloit, Wis. USA. Blade D, refer to FIG. 2E, is utilized to clear obstructions from the drain valve opening. This blade has a ½" wide straight leading edge 61 which tapers along one side 62 to 4" wide at about 12" back from that tip. The entire blade is approximately 16" long. It is shaped to facilitate reaching down through the oil in frypot 14 and into the drain pipe 28 (from the inside of frypot 14), and scraping or rotating to loosen particulates that have accrued there before draining the oil. The length, taper, and flexibility allow Blade D to reach through the oil (without the handle entering the oil) and clean out different diameter drain pipes (e.g. ½ to ¾" diameter or other). Other cleaning blade shapes are possible. For example, one similar to cleaning blade C except that it is wider could be used on non-heat tube type fryers. It could include a V-shape distal end or tip to be identical or close to the V-shape of the bottom of the fryer cool zone. Or the tip could be a more acute angle.

An alternative material for the blades could be PE (polyethylene) cutting boards, or HDPE (high-density polyethylene plastic), another material of which these boards are made. There are basically two types of HDPE boards being made. One version is made from injection-molded plastic, while the other is HDPE from an extrusion line. There are several certifications of plastic cutting boards, one being NSF (National Sanitation Foundation), that certifies the plastic has passed requirements to come in contact with food. HDPE material comes in a wide variety of dimensions and could be formed to size using the same methods as the FRP material. Thermal proprieties for HDPE generally are: DSC Melting Point: Homopolymer 275° F. 135° C., Copolymer 230-273° F. (110-134° C.). Specific Heat (@ 23° C.) 2.25 kJ/kg ° K. Heat of Fusion: Homopolymer 245 kJ/kg, Copolymer 140-232 kJ/kg. Thermal conductivity: Homopolymer 0.49 W/m ° K, Copolymer 0.40-0.47 W/m ° K. Vicat Softening Temperature: Homopolymer 270° F. 132° C., Copolymer 233-266° F. 112-130° C. Coefficient of Linear Thermal Expansion 12×10−5 in/(in ° F.) 12×10−5 cm/(cm ° C.). Shrinkage 0.018-0.020 in/in 0.018-0.020 cm/cm.

Re-sharpening blades A, B, or C is a simple matter of cutting the leading edge back ⅛" to keep that edge linear, if over time and usage, that edge chips, dulls, or deforms. The material of the blades A, B, or C is heat resistant, non-absorbent, non-corrosive, non-abrasive, and substantially rigid in its longitudinal plane.

The invention can take many forms and embodiments, such as variations obvious to those skilled in the art. For example, the precise materials, dimensions and configurations can vary according to need or design. Other blade materials with analogous properties are possible. For example, stainless steel or metal might be used but it tends to conduct heat from the blade unless a thermal insulator is placed between.

Alternatively the blades may be utilized to scrape the grease traps within any restaurant or car wash.

Another alternative is the manner in which the blade assemblies can be stored. One example is simply on some type of hook, sliding receiver, or other hanger built into a wall, a ceiling, or even the deep fat fryer exterior or interior. Another way would be by placing at least one magnet (see FIG. 2A) in the handle. It could then be temporarily suspended on any ferrous or magnetic surface. One example would be a magnetic metal surface on the deep fat fryer itself (see for example FIG. 1), such as the interior of the metal door that is open to gain access to the internal components. Another example would simply be a metal rail on a surface near the deep fat fryer. Others are possible.

Another alternative would be instructions that could be imprinted directly on one face of a blade. It could be printed, engraved, embossed, or some combination.

It should be appreciated that the principles by which the exemplary blades operate for their intended functions within a deep fat fryer are based on observation and experience. For example, as illustrated in FIG. 8F, the leading edge of the blade scrapes along the vertical surface down to the first transition to the V-shape. It then closely follows and scrapes that side of the V-shape down to the bottom of the V. It then scrapes continuously up at least a portion of the other side of the V-shape. By reciprocation of the blade along its longitudinal axis, that leading blade edge can continuously scrape along that entire path. It is therefore believed that the blade cooperates with the remaining hot oil to stay basically in abutment with the surfaces during that reciprocating motion. The blade does not permanently deform but seems to closely follow the surfaces, and when retracted returns to its basically planar nature. This may not fully describe the precise scientific principles that allow this to happen but is an observation regarding the functioning of the exemplary blades.

What is claimed is:

1. A method of maintaining a liquid fryer or broaster having a frypot for holding frying liquid with a length, width and depth including a V-shaped or conical bottom below one or more heat tubes extending across at least a portion of the frypot comprising:
    a. draining or removing a portion of the frying liquid from the frypot but leaving a portion in and above the V-shaped or conical bottom;
    b. providing a tool having a generally planar blade extending longitudinally from a first end to an opposite leading end, the blade comprising:
        i. a material comprising fiberglass reinforced plastic (FRP) panel material having sufficient stiffness to impart scraping force to the leading end over a range of temperatures, but sufficient flexibility over the range of temperatures to slide past the one or more heat tubes and over and past steps and angles of internal sides walls of the frypot, while having sufficient resilience to maintain scraping contract without deformation;
        ii. a length that is longer than a distance between the one or more heat tubes and the V-shaped or conical bottom;
        iii. a thermal insulation property to resist heat transfer along the length;
    c. grasping at or near the first end of the blade, guiding the leading end of the blade into the frypot, and scraping with the leading end of the blade along at least one of the internal side walls of the frypot beginning above and then down towards the V-shaped or conical bottom to agitate and lift collected solids and particles into suspension in the portion of the frying liquid left in the frypot;
    d. scraping with the leading end of the blade at least one of the internal side walls of the frypot beginning above and then down to and past the V-shaped or conical bottom and partially up an opposite one of the internal side walls of the frypot to agitate and lift collected solids and particles into suspension in the portion of the frying liquid left in the frypot; and
    e. draining from the frypot the portion of the frying liquid and suspended residues from the scraping.

2. The method of claim 1, further comprising after the step e:
    a. cleaning the interior of the frypot with another tool or substance; and
    b. refilling the frying liquid in the frypot.

3. The method of claim 1, further comprising:
    a. providing a second tool having a blade with a v-shaped tip complimentary to the v-shaped bottom of the frypot,
    b. scraping the v-shaped bottom along its length with the v-shaping complimentary tip of the second tool.

* * * * *

UNITED STATES PATENT AND TRADEMARK OFFICE
CERTIFICATE OF CORRECTION

| | | |
|---|---|---|
| PATENT NO. | : 10,028,639 B1 | Page 1 of 1 |
| APPLICATION NO. | : 14/616092 | |
| DATED | : July 24, 2018 | |
| INVENTOR(S) | : Joe Breitbach | |

It is certified that error appears in the above-identified patent and that said Letters Patent is hereby corrected as shown below:

In the Claims

<u>In Column 10, Claim 1(b)(i), Line 11:</u>
DELETE "contract"
INSERT --contact and--

Signed and Sealed this
Eighth Day of January, 2019

Andrei Iancu
*Director of the United States Patent and Trademark Office*